United States Patent

Pickles et al.

[15] 3,674,238
[45] July 4, 1972

[54] TUBULAR VALVE AND BODY STRUCTURE

[72] Inventors: Joseph Pickles, Birmingham; Chester S. Fudala, Detroit, both of Mich.

[73] Assignee: Ferro Manufacturing Corporation, Detroit, Mich.

[22] Filed: Aug. 24, 1970

[21] Appl. No.: 66,477

[52] U.S. Cl..............................251/309, 251/58, 251/314, 251/366, 137/DIG. 5
[51] Int. Cl..........................................................F16k 3/26
[58] Field of Search..................251/311, 309, 312, 366, 310, 251/58, 317, 367; 137/DIG. 5

[56] References Cited

UNITED STATES PATENTS

| | | | |
|---|---|---|---|
| 3,506,239 | 4/1970 | Johnson | 251/310 |
| 3,254,872 | 6/1966 | Roos | 251/309 X |
| 3,568,975 | 3/1971 | Obermaier | 251/58 |
| 2,663,459 | 12/1953 | La Grange et al. | 251/58 X |
| 2,973,181 | 2/1961 | Johnson | 251/310 X |

FOREIGN PATENTS OR APPLICATIONS

| | | | |
|---|---|---|---|
| 481,089 | 2/1952 | Canada | 251/309 |
| 1,240,580 | 8/1960 | France | 251/317 |

Primary Examiner—Arnold Rosenthal
Attorney—Whittemore, Hulbert & Belknap

[57] ABSTRACT

Valve structure in which a hollow generally tubular valve housing having opposed lateral ports is provided at its interior with a rotatable generally tubular valve body having opposed lateral openings and shaped such that upon rotation an imperforate wall portion of the valve body moves into closing relation with one of the ports of said valve housing.

5 Claims, 9 Drawing Figures

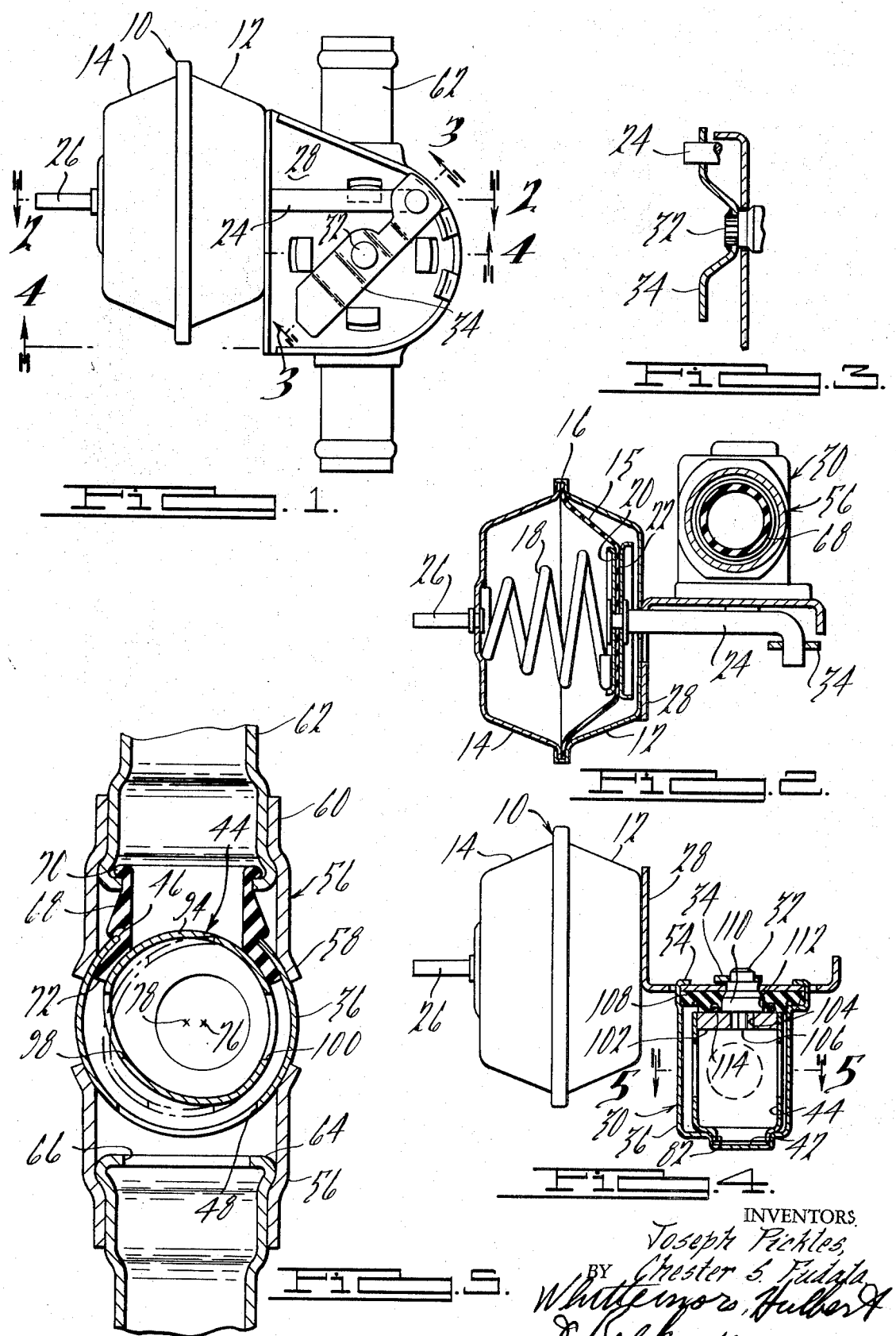

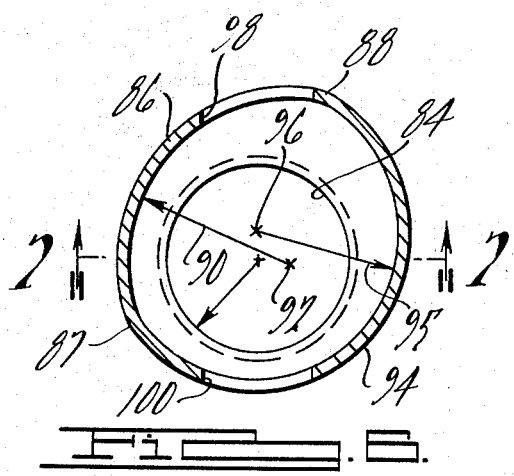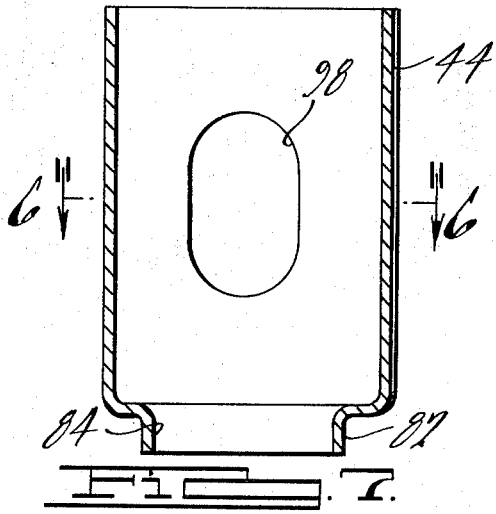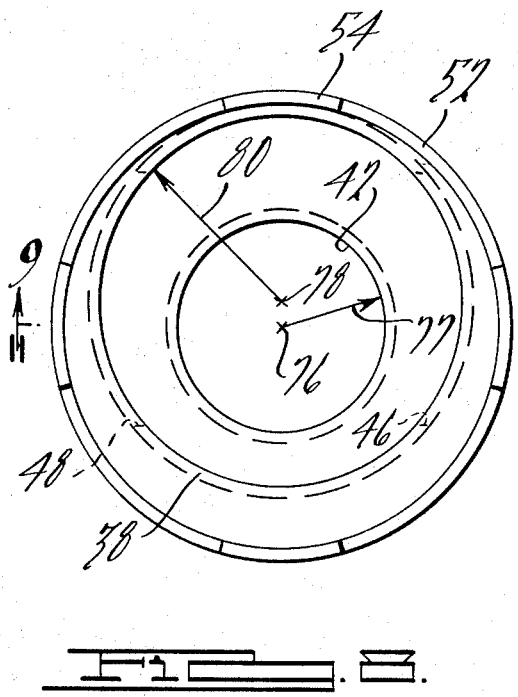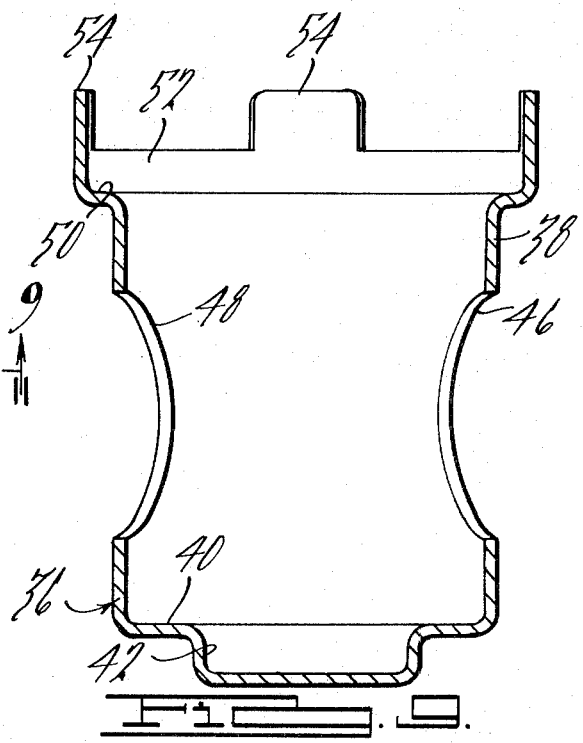

3,674,238

TUBULAR VALVE AND BODY STRUCTURE

BRIEF SUMMARY OF THE INVENTION

The valve structure comprises a generally tubular cup-shaped valve housing closed at one end and having at its open end a yieldable or elastic centrally apertured closure. Rotatable within the valve housing is a generally tubular hollow valve of non-cylindrical configuration and having a cover connected to an actuating stem which extends through the aperture in the top closure of said valve housing.

The valve housing includes inlet and outlet ports which are in generally opposed relationship. One of these ports is provided with a resilient seal which extends completely around the port. The transverse shape of the valve body is such that upon rotation in one direction, an imperforate wall portion thereof will engage the seal surrounding the inlet port and thus operate to close the opening through the valve structure.

The valve structure is associated with a fluid pressure actuated diaphragm unit and the operating stem carries a lever or bell crank which is operatively connected to the diaphragm of the unit. The diaphragm unit includes a housing carrying a bracket which is secured to the valve housing and serves as a mounting for the valve structure.

BRIEF DESCRIPTION OF THE DRAWINGS

FIG. 1 is a plan view of the diaphragm actuated valve structure.

FIG. 2 is a sectional view on the line 2—2, FIG. 1.

FIG. 3 is a fragmentary sectional view on the line 3—3, FIG. 1.

FIG. 4 is a sectional view on the broken line 4—4, FIG. 1.

FIG. 5 is an enlarged sectional view on the line 5—5, FIG. 4.

FIG. 6 is a sectional view of the valve body taken on the line 6—6, FIG. 7.

FIG. 7 is a sectional view on the line 7—7, FIG. 6.

FIG. 8 is a plan view of the valve housing.

FIG. 9 is a sectional view on the line 9—9, FIG. 8.

DETAILED DESCRIPTION

The diaphragm actuated valve structure comprises a pressure operated diaphragm unit indicated generally at 10 which in turn comprises a diaphragm casing 12 and cover 14 which together provide a sealed hollow chamber in which is received a flexible diaphragm 15 the edges of which are secured between abutting edge portions of the diaphragm casing and cover as best indicated at 16 in FIG. 2. Received within the diaphragm casing is a coil compression spring 18 one end of which bears against a spring seat 20 which cooperates with an annular retainer 22 to connect the diaphragm to an operating shaft 24. The interior of the diaphragm casing is connected to a suitable vacuum source by a tube 26. Obviously, upon evacuation of the interior of the diaphragm chamber, atmospheric pressure acting on the right hand side of the diaphragm will move the diaphragm to the left against the action of the compression spring 18.

Mounted on the diaphragm casing member 12 is a bracket 28 which is connected to and constitutes the support for valve structure indicated generally at 30. The valve structure includes an internal rotatable valve body as will subsequently be described, which is connected to an external operating stem 32 to which is fixedly secured an arm or bell crank 34 which is connected to an angularly bent end portion of the shaft 24.

The valve structure comprises a generally cup-shaped valve housing 36 which as best seen in FIGS. 8 and 9, has a cylindrical lateral wall 38 and a bottom wall 40 an intermediate portion of which is depressed to provide a piloting recess 42 for receiving the lower end of a rotatable valve body or element 44. Opposite sides of the cylindrical wall portion of the valve housing are provided with a generally circular opposed inlet port 46 and an outlet port 48. At its upper end the valve housing is provided with a radially extending ledge 50 terminating at its outer edge in an upstanding cylindrical extension 52 provided with a multiplicity of tangs 54. The tangs 54 are inserted through openings in the bracket 28 and bent over to constitute the connection between the valve structure 30 and the diaphragm unit 10. Secured to the outer surfaces of the valve body 36 are a pair of collars 56. The collars are shaped to provide continuous flanges at one end, as indicated at 58, to conform to the cylindrical outer surface of the valve housing 36, and at the outer ends are cylindrically shaped as indicated at 60 to interfit with short tube sections 62.

The tube sections 62 are provided within the collars 56 in outwardly extending beads 64 which terminate in radially inwardly extending flanges 66. One of these flanges, as appears at the top of FIG. 5, is connected to a generally tubular seal 68, the seal having at one end an outwardly extending bead 70 which fits within the bead 64 on the tube section 62. The seal 68 extends through the inlet port 46 of the valve body and includes a generally cylindrical sealing portion 72 which engages the rotatable valve body 44 as will subsequently be described, to provide sealing closure when the valve body is in closed position, as indicated in full lines in FIG. 5. The seal 68 is provided with a groove as seen in FIG. 5 which receives the edge of said housing surrounding the port 46.

Referring again to FIGS. 8 and 9, it will be observed that the piloting recess 42 is of cylindrical configuration and has its center of curvature at 76 as indicated by the arrow 77, whereas the lateral wall 38 of the cylindrical valve housing has its center of curvature at 78 as indicated by the arrow 80.

Referring now more particularly to FIGS. 6 and 7 the detailed configuration of the rotatable valve body 44 will be described. This body is generally tubular in shape and is open at both ends. At its lower end, as seen in FIG. 7, it is provided with an axially extending cylindrical flange 82 defining an opening 84. The flange 82, as best seen in FIG. 4, seats within the piloting recess 42. The opening 84 is of course circular. However, the lateral wall indicated generally at 44, of the tubular valve body is composed of two sections which as best illustrated in FIG. 6, are cylindrically formed but have centers of curvature eccentric with respect to the centers of curvature of the circular opening 84. One of these sections, designated 86 in FIG. 6, extends between the points 87 and 88 and has a radius of curvature as indicated by the arrow 90 and a center of curvature as indicated at 92. The points 87 and 88 are interconnected by another cylindrically formed wall section 94 having a radius of curvature as indicated by the arrow 95 and a center of curvature at 96. It will be observed that in the wall section 86 there is provided an inlet port 98 and in the wall section 94 there is provided an outlet port 100, the ports defining a passage extending laterally through said valve body.

The upper end of the rotatable valve body 44 is closed by a centrally apertured cover 102 having a non-circular opening 104 therein which receives a correspondingly non-circular extension 106 of the stem 32.

Received on the ledge 52 of the valve housing is a yieldable or elastic top closure 108 having a central opening through which an enlarged intermediate portion 110 of the stem 32 is rotatably received. The top closure includes a flexible flange 112 surrounded by a groove which receives a garter spring 114 urging the flange 112 into sealing closure with the intermediate portion 110 of the valve stem 32.

Referring now to FIG. 5 the valve structure is illustrated with the valve body 44 rotated to the position in which an imperforate portion of the wall 94 sealingly engages the cylindrical portion 72 of the seal. Upon rotation of the valve body 44 counterclockwise from the position shown in FIG. 5 to the position illustrated in dotted lines, it will be apparent that the cylindrical wall portion 94 has moved away from the sealing flange 72 and that in addition, the ports 98 and 100 have moved into alignment with the ports 46 and 48. Accordingly, a passage is provided through the generally tubular valve housing 36 and through the generally tubular valve body 44. In addition, it will be apparent of course that fluid may flow around the exterior of the valve body from the inlet port 46 to the outlet port 48 of the valve housing. However, the valve housing is completely sealed by virtue of the top closure 108 and particularly, by the action of the garter spring 114 urging the flexible flange 112 into sealing engagement with the intermediate portion 110 of the rotatable valve stem 32.

What we claim as our invention is:

1. Valve structure comprising a generally cylindrical valve housing having a port at one side thereof, a collar surrounding said port and having a continuous flange conforming and secured to the outer cylindrically shaped surface of the housing surrounding said port, said collar having a cylindrical outer end portion extending outwardly of said housing from said port, a short tube section having a cylindrical inner end portion conforming and secured to the cylindrical outer end portion of said collar, one of said cylindrical end portions having a radially inwardly extending seal-supporting flange, a resilient, generally tubular seal having a generally cylindrical outer portion provided with a radially outwardly extending flange engaging the outer side of said seal-supporting flange, said seal extending through said port and having an inner end portion cylindrically shaped at its outer surface to conform to the inner surface of said valve housing and similarly shaped at its inner surface to provide a valve seat surrounding said port, and a generally cylindrical valve element rotatably received in said valve housing for rotation about an axis parallel to the axis of said housing, said valve element having a passage extending laterally therethrough and having a generally cylindrically shaped exterior imperforate surface portion engageable with the valve seat provided by the inner end of said seal upon rotation of said valve element to close said valve.

2. Valve structure as defined in claim 1 in which the inner end portion of said short tube section is received within the cylindrical outer end portion of said collar, and in which the radially inwardly extending seal-supporting flange is provided at the inner end of said short tube section.

3. Valve structure as defined in claim 1 in which said radially inwardly extending seal-supporting flange is spaced substantially from said port, and in which said seal includes an intermediate generally tubular portion extending from said seal-supporting flange to said port.

4. Valve structure as defined in claim 3 in which the intermediate portion of said seal is provided with a groove which receives the edge of said housing surrounding said port.

5. Valve structure as defined in claim 1 in which said valve element is generally cylindrical and is composed of two portions interconnected along longitudinally extending straight lines, said portions being of circular cylindrical configuration having different radii of curvature and having the centers of curvature spaced apart, and arranged such that as the valve element is rotated from open to closed position, the exterior surface of an imperforate portion of the valve element moves from a position spaced radially inwardly from at least a portion of said seal into continuous engagement with said seal completely around said port.

* * * * *